(12) United States Patent
Callahan et al.

(10) Patent No.: US 7,017,930 B2
(45) Date of Patent: Mar. 28, 2006

(54) BICYCLE FORK WITH TENSIONED DAMPING MEMBER

(75) Inventors: Jean-Luc Callahan, Morgan Hill, CA (US); Christopher P. D'Aluisio, Watsonville, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 0 days.

(21) Appl. No.: 10/839,585

(22) Filed: May 5, 2004

(65) Prior Publication Data
US 2005/0248119 A1 Nov. 10, 2005

(51) Int. Cl.
*B62K 21/02* (2006.01)
(52) U.S. Cl. .................... 280/279; 280/304.3
(58) Field of Classification Search ................ 280/274, 280/275, 276, 277, 279, 304.3
See application file for complete search history.

(56) References Cited

U.S. PATENT DOCUMENTS

| 1,559,277 | A | | 10/1925 | Nelson |
|---|---|---|---|---|
| 2,236,127 | A | | 3/1941 | Alexander |
| 3,941,011 | A | | 3/1976 | Kirk |
| 4,138,132 | A | * | 2/1979 | Doyle ..................... 280/304.3 |
| 4,420,989 | A | | 12/1983 | Finkle |
| 4,939,950 | A | | 7/1990 | Girvin |
| 5,117,708 | A | | 6/1992 | Boyer et al. |
| 5,140,867 | A | | 8/1992 | Smith |
| 5,181,436 | A | | 1/1993 | Lai |
| 5,183,281 | A | * | 2/1993 | Stephens ..................... 280/279 |
| 5,186,074 | A | | 2/1993 | Arnold |
| 5,209,138 | A | | 5/1993 | Shu |
| 5,209,508 | A | | 5/1993 | Lennon |
| 5,220,851 | A | | 6/1993 | Flechel |
| 5,241,881 | A | | 9/1993 | Chen |

(Continued)

FOREIGN PATENT DOCUMENTS

DE 20106106 6/2001

(Continued)

*Primary Examiner*—Kevin Hurley
(74) *Attorney, Agent, or Firm*—Michael Best & Friedrich LLP

(57) ABSTRACT

A bicycle fork assembly designed to reduce the transfer of vibrations to the rider. This is accomplished by providing a damping member (e.g., made of a molded elastomer) that completely surrounds the outer surface of a fork member. Preferably, the damping member is in tension when mounted on the fork member such that the damping member compresses the fork member to thereby reduce transmission of vibrations through the fork. In addition, the fork member can be provided with a necked portion that receives the damping member. Preferably, the damping member is positioned closer to the fork tip than to the fork crown. The damping member can comprise two portions having different colors, durometers, and densities. Preferably, the damping member is formed separate from the fork member, and subsequently slid onto the outer surface of the fork member. Alternatively, the damping member could be molded in place on the fork member.

15 Claims, 6 Drawing Sheets

U.S. PATENT DOCUMENTS

| | | |
|---|---|---|
| 5,253,544 A | 10/1993 | Allsop et al. |
| 5,257,552 A | 11/1993 | Boyer et al. |
| 5,285,697 A | 2/1994 | Clausen |
| 5,319,995 A | 6/1994 | Huang |
| 5,377,557 A | 1/1995 | Nastrucci |
| 5,467,665 A | 11/1995 | Huang |
| 5,511,444 A | 4/1996 | Clausen et al. |
| 5,678,457 A | 10/1997 | Hals |
| 5,833,259 A * | 11/1998 | Stewart ............... 280/276 |
| 6,109,637 A | 8/2000 | Kirk |
| 6,669,218 B1 | 12/2003 | Sinyard et al. |
| 2003/0226421 A1 | 12/2003 | Livingston |

FOREIGN PATENT DOCUMENTS

| | | |
|---|---|---|
| FR | 2810291 | 6/2000 |
| WO | 01/96173 | 12/2001 |

* cited by examiner

BICYCLE FORK WITH TENSIONED DAMPING MEMBER

BACKGROUND

The present invention generally relates to bicycles, and particularly to bicycle forks that are designed to dampen vibrations.

Bicycles include a frame that receives two wheels and supports a seat for supporting the rider and handlebars for allowing the rider to steer the bicycle. The frame includes a main frame and a front fork that rotates relative to the main frame to allow steering and control of the bicycle.

During a bicycle ride, the rider will often encounter bumps or uneven road conditions that cause vibrations. Many of these vibrations will travel through the wheels and the frame to the seat and handlebars. From the seat and handlebars, the vibrations can pass into the rider's torso and arms. These vibrations can be uncomfortable to the rider.

SUMMARY

The present invention provides a bicycle fork assembly designed to reduce the transfer of vibrations to the rider. This is accomplished by providing a damping member (e.g., made of a molded elastomer) that completely surrounds the outer surface of a fork member (e.g., a fork tube). Preferably, the damping member is in tension when mounted on the fork member such that the damping member compresses the fork member to thereby reduce transmission of vibrations through the fork. In addition, the fork member can be provided with a necked portion that receives the damping member. Preferably, the damping member is positioned closer to the fork tip than to the fork crown.

The damping member can comprise two portions having different colors, durometers, and densities. Preferably, the damping member is formed separate from the fork member, and subsequently slid onto the outer surface of the fork member. Alternatively, the damping member could be molded in place on the fork member.

BRIEF DESCRIPTION OF THE DRAWINGS

The detailed description particularly refers to the accompanying figures in which.

Before any embodiments of the invention are explained, it is to be understood that the invention is not limited in its application to the details of construction and the arrangements of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof is meant to encompass the items listed thereafter and equivalence thereof as well as additional items. The terms "connected," "coupled," and "mounted" and variations thereof are used broadly and encompass direct and indirect connections, couplings, and mountings.

DETAILED DESCRIPTION OF THE DRAWINGS

Figure 1:
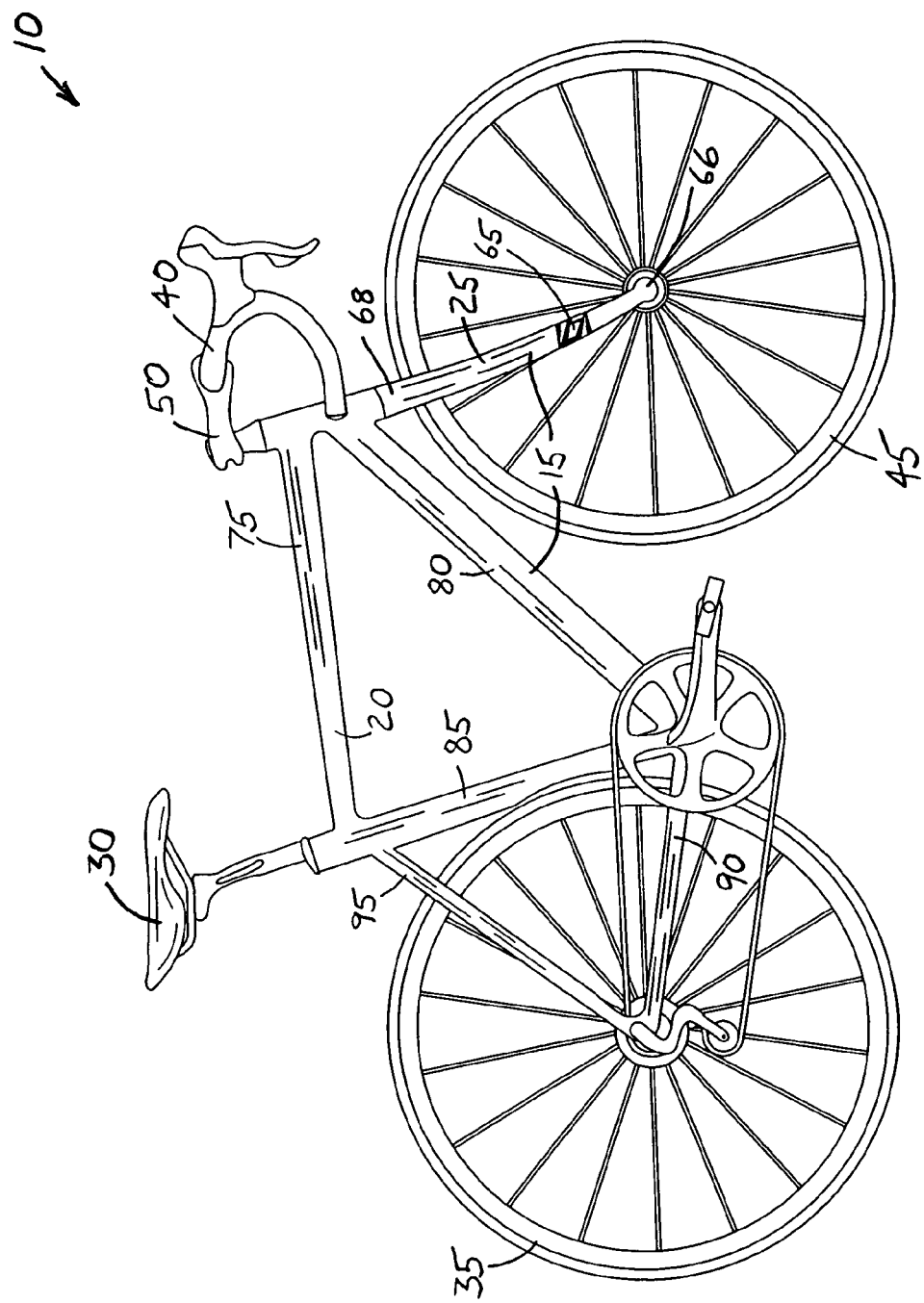
FIG. 1 is a side view of a bicycle including a front fork embodying the present invention.
Figure 2:
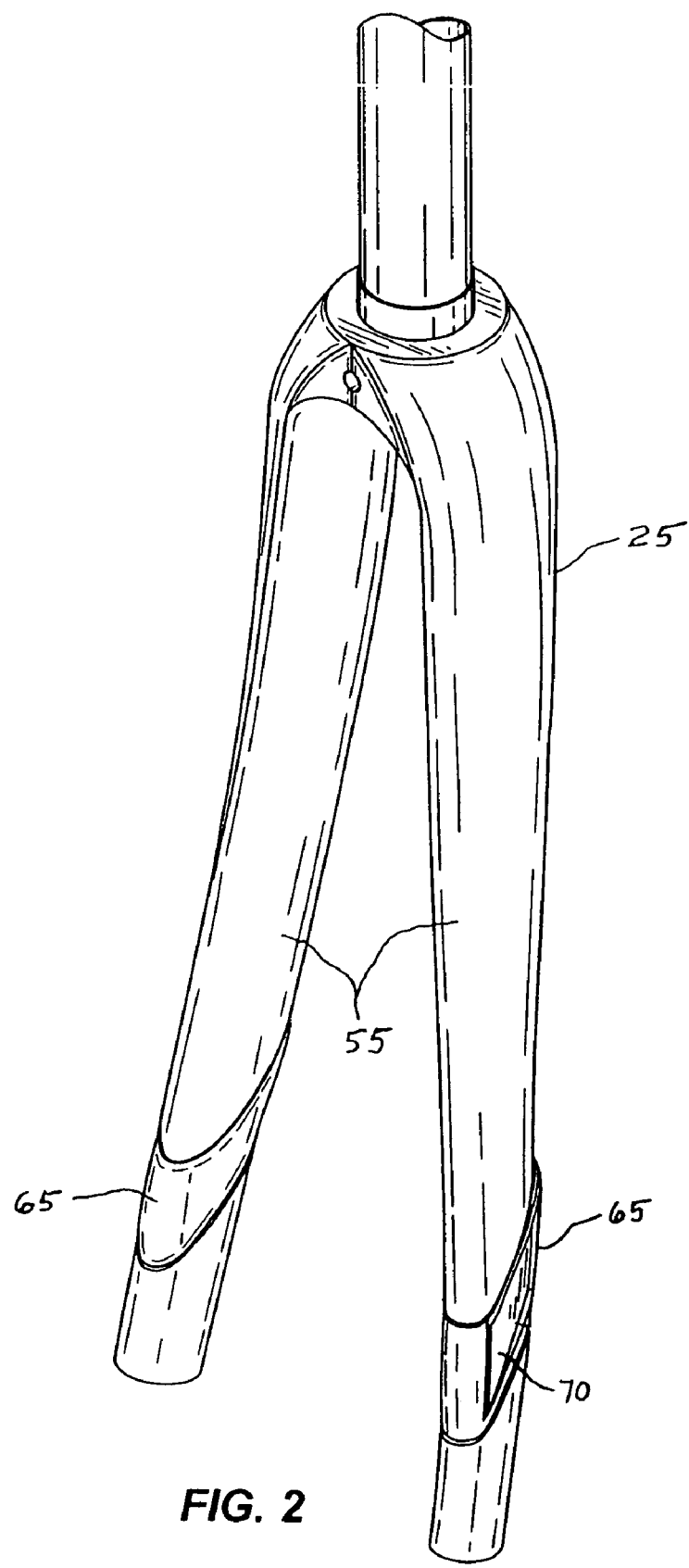
FIG. 2 is an enlarged perspective view of the front fork of FIG. 1.

FIG. 1 illustrates a bicycle 10 including a frame assembly 15 embodying the present invention. The frame assembly 15 includes a main frame 20 and a front fork 25. The main frame 20 supports a seat 30 and a rear wheel 35, and the front fork 25 supports a handlebar 40 and a front wheel 45. A rider sits on the seat 30 and pedals the bicycle 10 to rotate the rear wheel 35 and propel the bicycle 10, as is well known in the art. The front fork 25 passes through a portion of the main frame 20 and pivotally supports the front wheel 45 so that the rider is able to steer the bicycle 10. A stem 50 is attached to, or is formed as part of, the front fork 25 and facilitates the attachment of the handlebar 40 to the fork 25. It should be noted that the bicycle 10 shown in FIG. 1 is but one example of a bicycle suited to use with the present invention. As such, the present invention should not be limited to the illustrated example.

Referring to FIGS. 2–5, the front fork 25 includes frame members in the form of two fork tubes 55 and has an axle-to-crown length (L) of about 370 mm. Each fork tube 55 includes a necked portion 60 (see FIGS. 3 and 5) having a depth of about 1.5 mm recessed inward relative to the outer surface of the adjacent fork tube 55. Each necked portion 60 receives a damping member 65 designed to reduced vibrations traveling from the front wheel 45 to the handlebar 40. As shown in FIG. 1, the damping member 65 is positioned closer to the fork tip 66 than to the fork crown 68.

Figure 3:
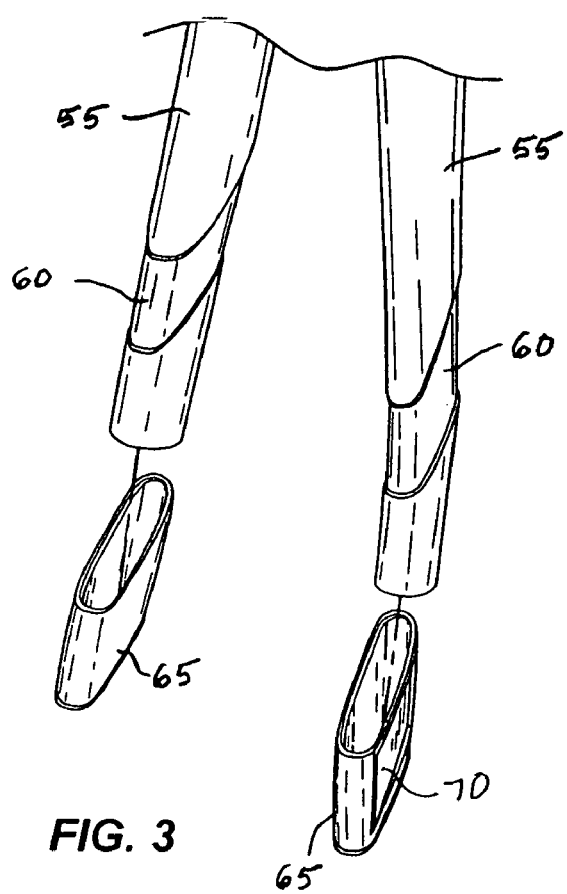
FIG. 3 is an enlarged exploded view of front fork of FIG. 2.
Figure 6:
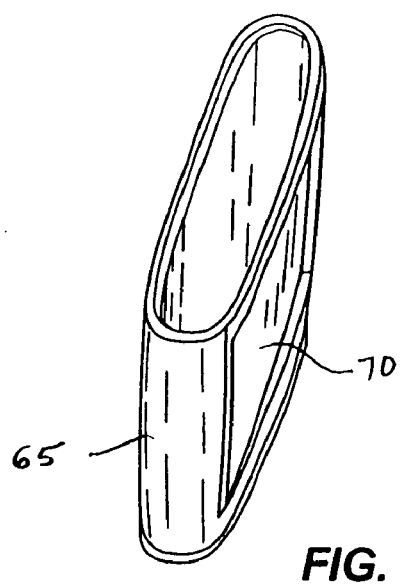
FIG. 6 is a perspective view of the damping member of FIG. 3.

As shown in FIG. 3, each damping member 65 of the illustrated embodiment is formed separate from the fork tubes 55. The damping members 65 are subsequently slid onto the outer surface of the fork tubes 55 until they are properly seated in the corresponding necked portions 60. If desired, the damping members 65 can be bonded onto the fork tubes 55 using an appropriate adhesive or other suitable method. However, it preferred to avoid the use of an adhesive to reduce costs and to facilitate subsequent removal and replacement of the damping member 65. It should be understood that the damping members 65 could instead be molded onto the fork tubes, or the fork tubes could be molded into the damping members 65.

Each damping member 65 has an inner perimeter that is smaller than the outer perimeter of the corresponding necked portion 60. This results in the damping member 65 being in tension and proving localized compression on the fork tube 55 when mounted on the necked portion 60. The compressive force provided by the damping member 65 on the outer surface of the fork tube 55 affects the vibration damping characteristics of the assembly.

Figures 4, 5:
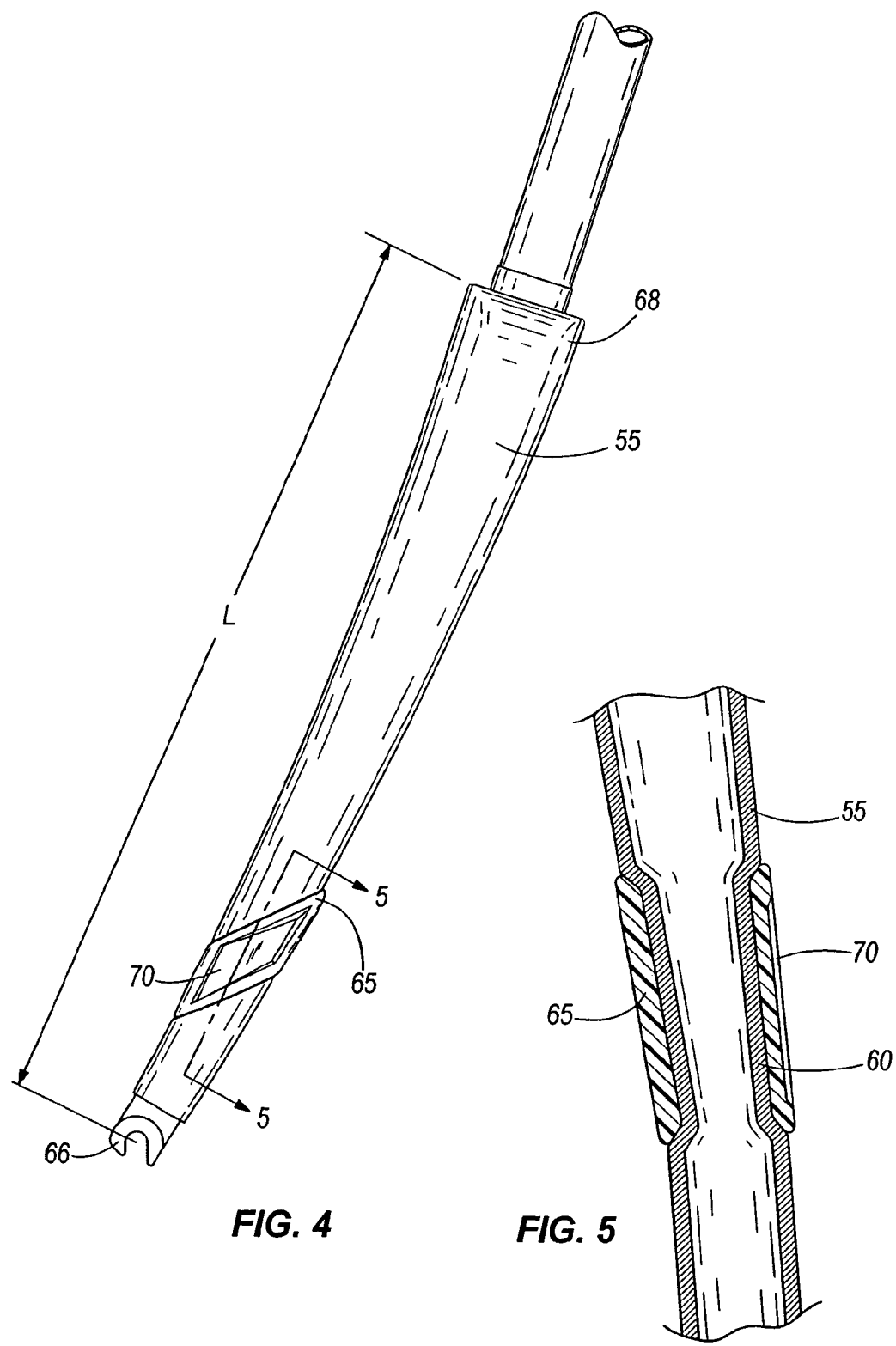
FIG. 4 is an enlarged side view of the front fork of FIG. 1.
FIG. 5 is an enlarged section view taken along line 5—5 of FIG. 4 and showing a damping member mounted on a fork tube.

Each damping member 65 is made from a molded elastomer. In the illustrated embodiment, the damping members 65 are made from KRATON G, which has a Shore A hardness of about 31, but could be made from any suitable material, such as polyurethane, plastic, natural rubber, and the like. The wall of the damping member 65 is about 1.75 mm thick. When mounted on the fork tube 55, the damping member 65 is designed to protrude slightly outward beyond the adjacent surfaces of the fork tubes 55, as shown in FIG. 5. The length of the damping member 65 is chosen to be slightly larger than the length of the necked portion 60. When the damping member 65 is stretched to be mounted on the fork tube 55, its length will shorten so that it fits snugly in the necked portion 60.

Referring to FIG. 4, the necked portions 60 and damping members 65 are asymmetrical relative to a centerline of the fork tubes 55. More specifically, the necked portions 60 and damping members 65 are angled such that they are higher on the back of the fork tubes 55 than on the front.

The damping members 65 also include a recessed area 70 that provides a location for placement of designs, trademarks, or logos.

When properly mounted on a bicycle frame, the damping members 65 dampen vibrations traveling through the fork tubes 55. It should be understood that the present invention could also be used in connection with other frame members, such as the frame members associated with the main frame 20. For example, damping members similar to those described above could be applied to the top tube 75, down tube 80, seat tube 85, chain stays 90, seat stays 95, or any other suitable frame member. In addition, it should be understood that the damping member of the present invention can be used on frame members that do not have necked portions, in which case the damping member will protrude more prominently beyond the outer surface of the adjacent frame member.

Figure 7:
FIG. 7 is side view of an alternative construction of a front fork.
Figure 8:
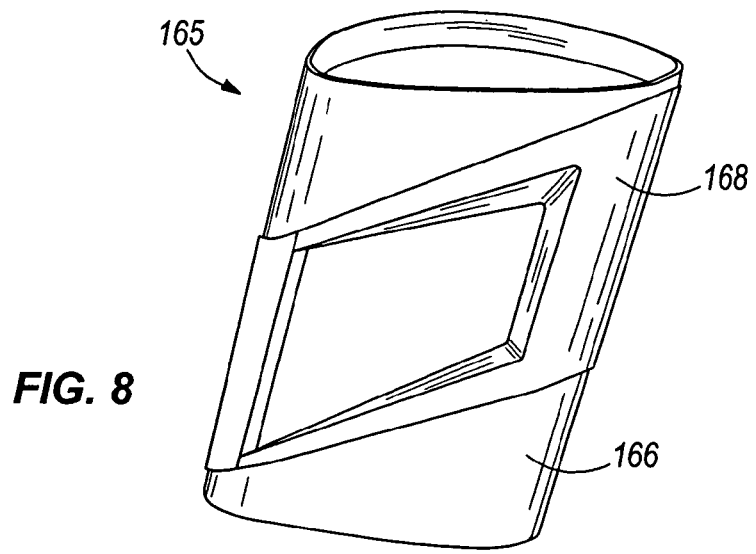
FIG. 8 is an enlarged perspective view of the damping member of FIG. 7.
Figure 9:
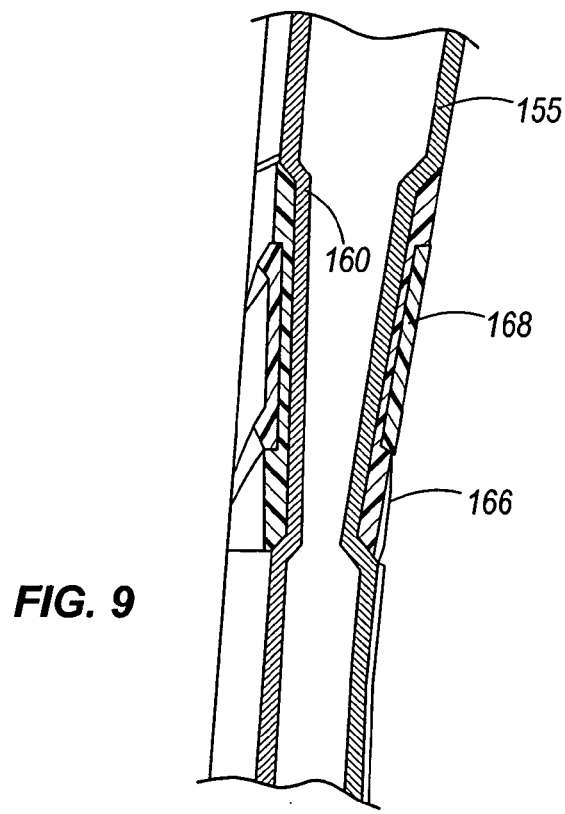
FIG. 9 is an enlarged section view taken along line 9—9 of FIG. 7 and showing a damping member mounted on a fork tube.

In the alternative design of FIGS. 7–9, each damping member 165 includes a first portion 166 that supports a second portion 168. The first portion 166 provides the compressive forces needed to properly hold the damping member 165 in place on the fork tube 155. The second portion 168 provides added compressive force and further adds aesthetic design elements to the damping member 165. In one embodiment, the first portion 166 is colored to match the color of the fork tube 155, and the second portion 168 is a different color. This configuration tends to hide the first portion 166 and emphasize the second portion 168 to draw attention to the aesthetically pleasing aspects of the second portion 168. In addition, the first portion 166 and second portion 168 can be designed to have different thicknesses, densities and durometers in order to alter the vibration damping characteristics of the assembly.

The damping member 165 described above is manufactured using a two-mold injection molding machine (not illustrated). The second portion 168 is created using the first mold, and is then transferred to the second mold. The first portion 166 is then co-molded to the second portion 168 to create a unitary part.

The wall of the first portion 166 is about 1.75 mm thick and, when mounted on the fork tube 155, is designed to protrude slightly outward beyond the adjacent surfaces of the fork tubes 155, as shown in FIG. 9. The wall of the second portion 168 is thicker than the first portion 166 and can be varied depending on the desired functional and aesthetic results. The illustrated damping members 165 are about 45 mm long when mounted on the fork tubes 155 in order to fit snugly in the necked portions 160. In order to achieve a good fit, the length of the damping members 165 prior to installation on the fork tubes 155 must be slightly greater than the length of the necked portions 160. When the damping members 165 are stretched to fit onto the fork tubes 155, they will shorten slightly to fit properly into the necked portions 160.

Although the invention has been described in detail with reference to certain preferred embodiments, variations and modifications exist within the scope and spirit of the invention as described and defined in the following claims.

What is claimed is:

1. A bicycle comprising:
    a wheel;
    a main frame coupled to the wheel;
    a fork coupled to the main frame and including a fork member having outer surface;
    a seat coupled to the frame and providing a location for supporting a rider;
    a handlebar coupled to the fork and providing a location for steering the bicycle; and
    a damping member disposed on the outer surface and completely surrounding the fork member, wherein the damping member is in tension when mounted on the fork.

2. The bicycle of claim 1, wherein the front fork has a fork tip coupled to a front wheel and a fork crown adjacent the main frame, and wherein the damping member is positioned closer to the fork tip than to the fork crown.

3. The bicycle of claim 1, wherein the fork member comprises a necked portion and a non-necked portion, and wherein the damping member is positioned on the necked portion.

4. The bicycle of claim 3, wherein the necked portion has a depth relative to the non-necked portion, and wherein the damping member has a thickness greater than the depth such that the damping member protrudes beyond an outer surface of the non-necked portion.

5. The bicycle of claim 1, wherein the damping member comprises a molded elastomer.

6. The bicycle of claim 1, wherein the damping member is not bonded to the fork.

7. The bicycle of claim 1, wherein the damping member comprises:
    a first portion having a first color; and
    a second portion having a second color.

8. The bicycle of claim 1, wherein the damping member comprises:
    a first portion having a first durometer; and
    a second portion having a durometer.

9. A fork assembly comprising:
    a fork member having an outer surface; and
    a damping member disposed on the outer surface and completely surrounding the fork member, wherein the damping member is in tension when mounted on the fork member.

10. The fork assembly of claim 9, wherein the fork member comprises a necked portion and a non-necked portion, and wherein the damping member is positioned on the necked portion.

11. The fork assembly of claim 10, wherein the necked portion has a depth relative to the non-necked portion, and wherein the damping member has a thickness greater than the depth such that the damping member protrudes beyond an outer surface of the non-necked portion.

12. The fork assembly of claim 9, wherein the damping member comprises a molded elastomer.

13. The fork assembly of claim 9, wherein the damping member is not bonded to the fork member.

14. The fork assembly of claim 9, wherein the damping member comprises:

a first portion having a first color; and
a second portion having a second color.

15. The fork assembly of claim 9, wherein the damping member comprises:

a first portion having a first durometer; and
a second portion having a durometer.

* * * * *